(12) United States Patent
Kirk

(10) Patent No.: US 12,498,501 B2
(45) Date of Patent: Dec. 16, 2025

(54) SYSTEMS AND METHODS FOR DETECTING ELECTROSTATIC CHARGE OF AN UNDERGROUND NON-METALLIC PIPE

(71) Applicant: David Edward Kirk, San Diego, CA (US)

(72) Inventor: David Edward Kirk, San Diego, CA (US)

( * ) Notice: Subject to any disclaimer, the term of this patent is extended or adjusted under 35 U.S.C. 154(b) by 165 days.

(21) Appl. No.: 18/446,016

(22) Filed: Aug. 8, 2023

(65) Prior Publication Data
US 2025/0052923 A1  Feb. 13, 2025

(51) Int. Cl.
*G01V 3/12* (2006.01)
(52) U.S. Cl.
CPC ..................... *G01V 3/12* (2013.01)
(58) Field of Classification Search
CPC ............. G01V 3/12; G01V 3/08; G01V 3/088
See application file for complete search history.

(56) References Cited

U.S. PATENT DOCUMENTS

| | | | |
|---|---|---|---|
| 7,023,213 B2 * | 4/2006 | Nichols | G01V 3/083 324/348 |
| 7,675,289 B1 * | 3/2010 | Stolarczyk | G01V 3/15 324/334 |
| 9,356,706 B2 | 5/2016 | Stolarczyk et al. | |
| 9,541,641 B2 | 1/2017 | Stolarczyk et al. | |
| 9,645,237 B2 | 5/2017 | Stolarczyk | |
| 10,753,907 B2 | 8/2020 | Bates | |
| 2006/0178849 A1 * | 8/2006 | Maier | G01V 3/12 702/66 |
| 2017/0097440 A1 | 4/2017 | Stolarczyk | |
| 2017/0160420 A1 * | 6/2017 | Olsson | G01V 3/12 |
| 2018/0356559 A1 | 12/2018 | Ruskin | |
| 2022/0026249 A1 | 1/2022 | Wang et al. | |

FOREIGN PATENT DOCUMENTS

| | | |
|---|---|---|
| CN | 202794563 U | 3/2013 |
| CN | 205049758 U | 2/2016 |
| CN | 107703551 A | 2/2018 |
| CN | 109917448 A | 6/2019 |
| CN | 110161556 A | 8/2019 |
| CN | 110196449 A | 9/2019 |
| CN | 113418050 A | 9/2021 |
| CN | 113359194 B | 11/2021 |

(Continued)

OTHER PUBLICATIONS

Wu, et al, "Node Localization in Robotic Sensor Networks for Pipeline Inspection," IEEE Transactions of Industrial Informatics, vol. 12, No. 2, Apr. 2, 2016, 11 pages.

(Continued)

*Primary Examiner* — Judy Nguyen
*Assistant Examiner* — Adam S Clarke
(74) *Attorney, Agent, or Firm* — Berkeley Law & Technology Group, LLP

(57) ABSTRACT

Disclosed are devices and processes for detecting an underground non-metallic pipe. An electrostatic detection device may characterize and/or measure at least one parameter of a non-metallic pipe based, at least in part, on a difference between a measurement of a strength of a first RF signal and measurement of a strength of a second RF signal.

15 Claims, 12 Drawing Sheets

(56) References Cited

FOREIGN PATENT DOCUMENTS

| | | |
|---|---|---|
| CN | 114017686 A | 2/2022 |
| CN | 216306928 U | 4/2022 |
| CN | 115166838 B | 12/2022 |
| CN | 218037381 U | 12/2022 |
| CN | 115685210 A | 2/2023 |
| JP | 2002228602 A | 8/2002 |

OTHER PUBLICATIONS

Jalil, et al, "Ground Penetrating Radar for Detecting Underground Pipe Buried in Different Type Materials," 2019 IEEE 10th Control and System Graduate Research Colloquium (ICSGRC 2019), Aug. 2-3, 2019, 6 pages.

Ge, et al, "Current Trends and Perspectives of Detection and Location for Buried Non-Metallic Pipelines," Chinese Journal of Mechanical Engineering, https://doi.org/10.1186/s10033-021-00613-z, 34:97, Dec. 2021, 29 pages.

* cited by examiner

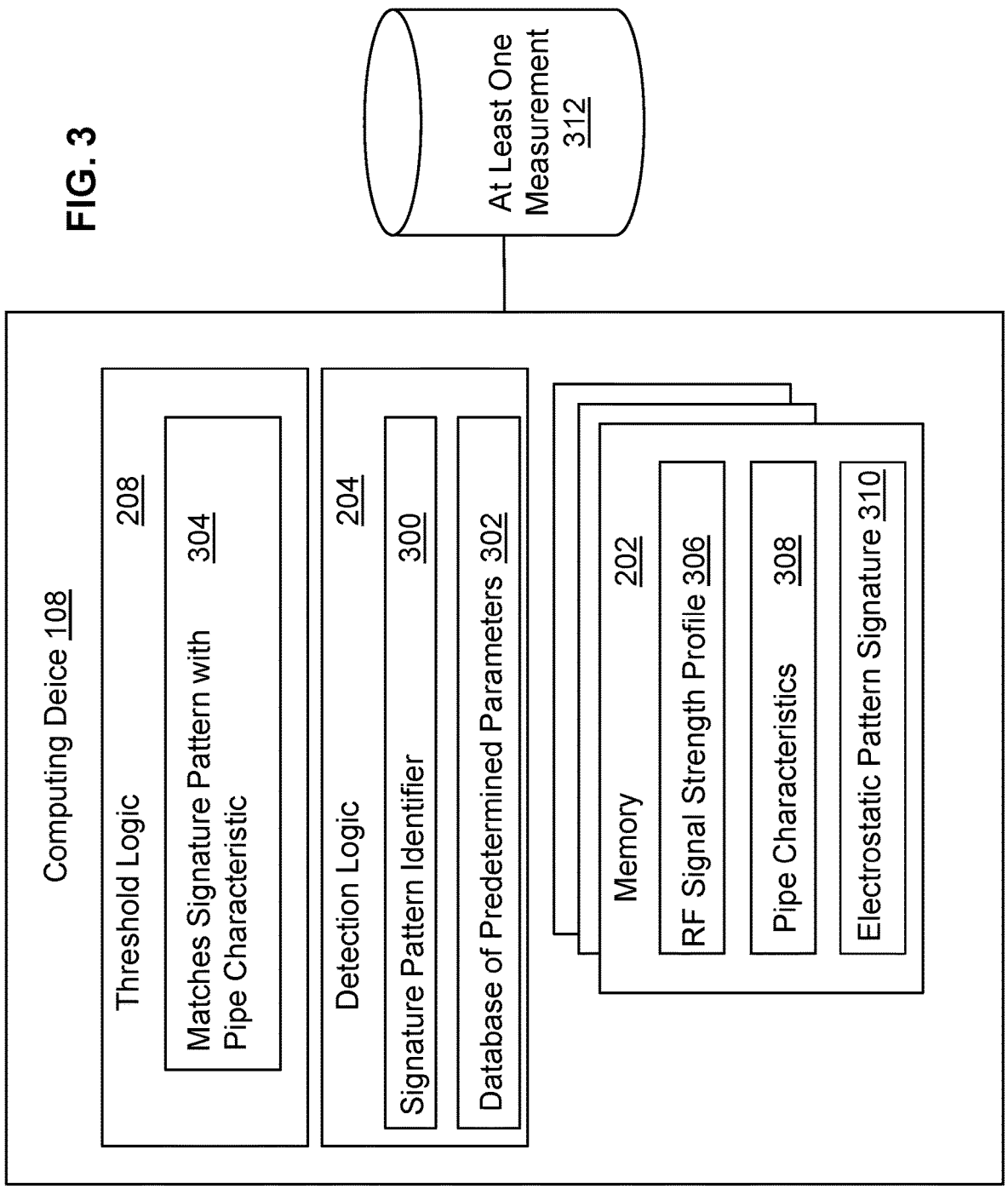

SYSTEMS AND METHODS FOR DETECTING ELECTROSTATIC CHARGE OF AN UNDERGROUND NON-METALLIC PIPE

BACKGROUND

1. Field

Embodiments disclosed herein relate to a system and method for detecting and characterizing subterranean objects.

2. Information

In many construction applications, it is often desirable to plan operations based on existing infrastructure such as existing plumbing infrastructure. For example, prior to commencement of a construction project, it may be useful to map out existing underground plumbing infrastructure. In one implementation, existing underground metallic plumbing infrastructure may be characterized using well known metal detection equipment above ground.

Modern underground plumbing typically includes a mixture of metallic and non-metallic materials for pipes. For example, underground plumbing typically includes pipes made of poly vinyl chloride or fiberglass, just to provide a couple of examples of non-metallic materials that may be used to construct underground plumbing. While use of existing metal detection equipment may be effective at characterizing existing installations of underground metal pipes, use of existing metal detection equipment may be largely ineffective at detecting and/or characterizing underground plumbing of pipes made of non-metallic materials.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIG. 3 is a schematic block diagram illustrating components of a computing device, in accordance with an embodiment;

Figure 1:
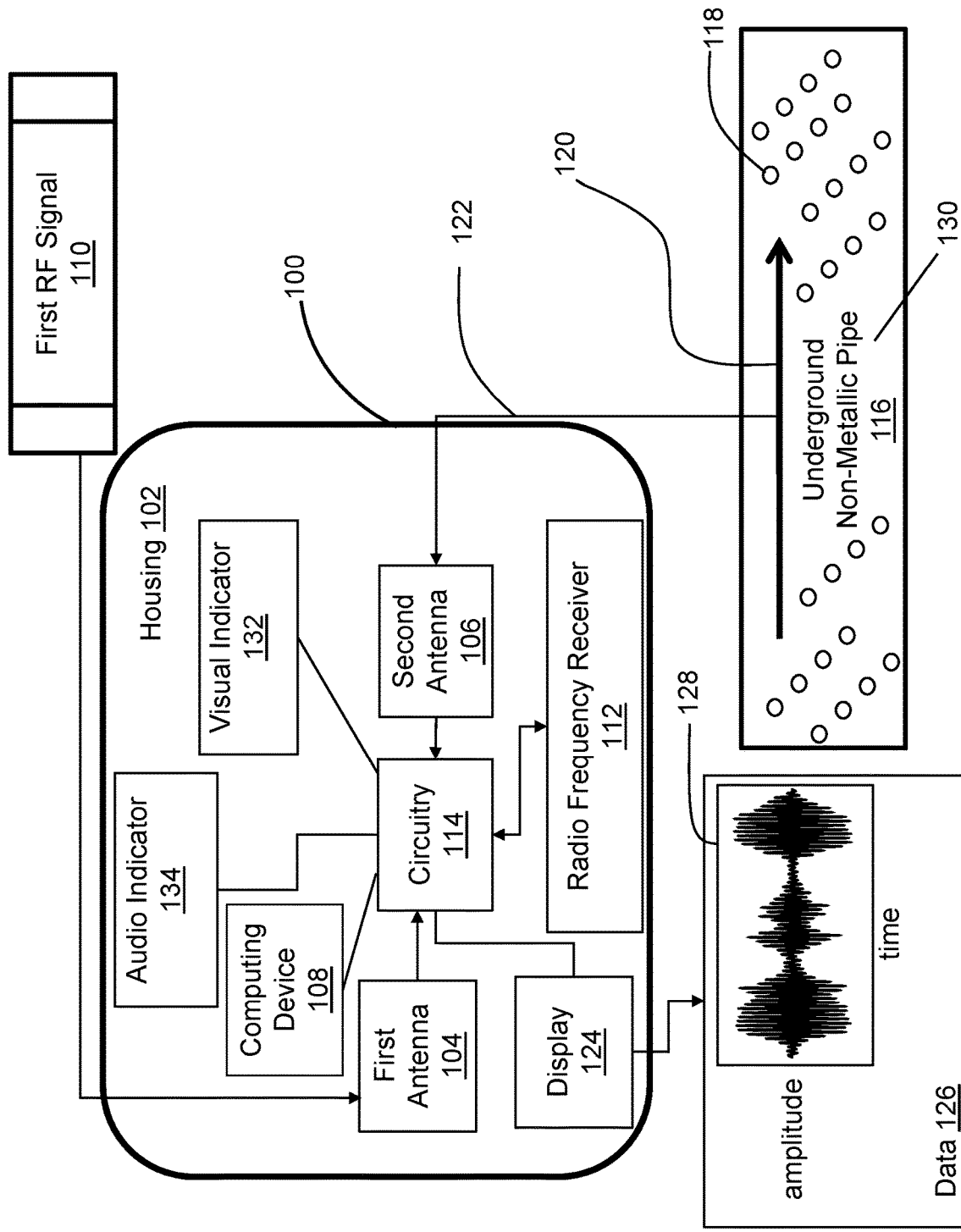
FIG. 1 is a schematic block diagram illustrating a system for an electrostatic detection device to detect an underground non-metallic pipe retaining a fluid, in accordance with an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, one aspect, an aspect, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

According to an embodiment, it may be observed that an electrostatic charge and/or triboelectric charge may build up on a non-metallic or a plastic pipe over time arising from various conditions and/or events. Such electrostatic charge and/or triboelectric charge may collect on a plastic pipe in the course of handling the pipe in storage, shipping, installation, repair, flow of fluid or particulate matter through the pipe, for example. Gas flow disrupters, such as pipe elbows, values, neckdowns and leaks, may further contribute to build-up of electrostatic charge and/or triboelectric charge on a plastic pipe. It may be further observed that electrostatic charge and/or triboelectric charge that collected on an underground plastic pipe may amplify an oscillating ambient radio frequency (RF) signal (e.g., transmitted from a local AM radio station). In the case of triboelectric charge formed on a plastic pipe, an inherent current may oscillate at a particular frequency. According to an embodiment, an oscillating ambient RF signal may modulate and/or control an oscillation frequency of a triboelectric charge current on an underground plastic pipe such that the underground plastic pipe emits an amplification of the ambient RF signal to impart a gain.

According to an embodiment, a technique for detecting a presence of one or more underground non-metallic pipes may be based, at least in part, on a measured strength of an ambient RF signal and a measured strength of an RF signal emitted from the ground. In one implementation, the ambient RF signal may be received at a first antenna, and may be selected to be at a particular frequency (e.g., frequency band). For example, the ambient RF signal received at the first antenna may be processed by a first RF receiver tuned to detect a strongest ambient RF signal (e.g., strongest local AM radio signal). An RF signal emitted from the ground may be received at a second antenna and processed by a second RF receiver by, for example, tuning the second RF receiver to the same frequency band as that of the strongest ambient RF signal.

In one embodiment, a presence of an underground plastic pipe may be detected based, at least in part, on a difference between a measured strength of a signal processed at the first RF receiver and a measured strength of a signal processed at the second RF receiver. In another embodiment, such a presence of an underground plastic pipe may be detected based, at least in part, on a measured gain applied to the first RF signal as measured by a signal strength of the second RF signal. In addition to detection of a presence of an underground plastic pipe, such a difference between a measured strength of a signal processed at a first RF receiver and a measured strength of a signal processed at a second RF receiver may be used to measure dimensions of the underground plastic pipe such as length, diameter and/or depth, and/or a combination thereof.

In accordance with principles of one embodiment, a system may include an electrostatic detection device that may receive a first RF signal at a first antenna to sample a received signal strength of the first RF signal. Such an electrostatic detection device may receive and sample a second RF signal (e.g., received at a second antenna). In a particular implementation, the first RF signal may comprise an ambient RF signal (e.g., a strongest received broadcast AM signal) and the second signal may comprise an RF signal emitted from one or more underground non-metallic pipes. An electrostatic detection device may characterize and/or measure at least one parameter of the one or more non-metallic pipes. The at least one parameter may comprise a diameter, a length, an elevation, and/or a depth. Such a parameter may be measured based, at least in part, on a measurement of a strength of the first RF signal and a measurement of a strength of the second RF signal. In one example, such a parameter may be measured and/or characterized based, at least in part, on a difference between the sampled received signal strengths of the first and second RF signals. In another example, such a parameter may be measured and/or characterized based, at least in part, on a gain applied to the first RF signal as measured by the sampled received signal strength of the second RF signal.

In one aspect of an embodiment, a triboelectric effect may arise from a type of contact electrification in which certain materials, such as in the course of the manufacture of some non-metallic pipes, collect an electric charge by friction. Such friction may occur, for example, while a non-metallic pipe comes into contact with another material such as a liquid and/or a gas flowing through the non-metallic pipe. Triboelectric charges collected from such a triboelectric effect may be exploited in detection of underground non-metallic pipes. Various signal processing techniques applied by particular embodiments may be used to measure and/or characterize a size, a profile, a material type, a diameter, a length, an elevation, and/or a depth of a detected underground non-metallic pipe. In one aspect of embodiments, an electrostatic detection device may measure changes in a gain applied to an ambient radio signal strength to detect an object buried at a particular depth up to fifteen feet or more deep beneath the ground surface. Such a detected object may include, for example, a non-metallic pipe, a metallic pipe, a metal object, a coin, jewelry, and/or trash, just to provide a few examples.

In a particular implementation, a gain applied to an ambient radio signal measured at an electrostatic detection device may be used to detect, for example, a leak of a non-metallic pipe retaining a fluid using example signal processing techniques discussed herein. Generally, when applying pattern recognition data analysis methods to the measured radio signal strengths received by the electrostatic detection device, one or more machine learning algorithms may automatically recognize a pattern and/or an irregularity in the collected data. Thus, the recognized pattern may be interpreted by the system as a leak of the underground non-metallic pipe.

FIG. 1 is a block diagram illustrating a system for components of electrostatic detection device 100 configured to receive second RF signal 122 emitted from underground non-metallic pipe 116 retaining a fluid 118. Underground non-metallic pipe 116 may comprise any plastic material such as polyvinylchloride (PVC), chlorinated PVC (CPVC), cross-linked polyethylene (PEX), and/or high-density polyethylene (HDPE), just to provide a few examples. In one implementation, electrostatic detection device 100 may be configured to detect an underground metallic pipe and/or an underground non-metallic pipe, for example. Fluid 118 may include, for example, a gas and/or any liquid such as water and/or sewage. In another implementation, underground non-metallic pipe 116 may provide a conduit for electrical wiring (not shown). In one embodiment, an electrostatic detection system may be configured for detecting an effect of flux 120 on a RF signal signature 128 while fluid 118 flows through chamber 130 of underground non-metallic pipe 116. In particular implementations, RF signal signature 128 may express an electrostatic flux pattern signature resulting in the amplitude of many RF signal samples collected over time.

FIG. 1 illustrates electrostatic detection device 100 having housing 102, according to an embodiment. Housing 102 may enclose circuitry 114. Circuitry 114 is electrically connected to computing device 108. Computing device 108 may comprise a processor capable of executing computer-readable instructions stored on memory 202, for example. For example, an implementation of a computing device 108 may include a CPU, graphics processing unit (GPU) and/or a neural processor unit (NPU), just to provide a few examples. RF receiver 112 is electrically connected to circuitry 114. First antenna 104 is in electrical communication with circuitry 114. First antenna 104 may be configured to receive a first RF signal 110 such as an ambient signal. The first RF signal 110 may comprise at least one stray RF in an environment such as, one or more RF signals from a source that is not the non-metallic pipe being detected and/or characterized. Second antenna 106 may be in electrical communication with circuitry 114. Second antenna 106 may be oriented to receive a second RF signal 122 from beneath a surface of ground. For example, second antenna 106 may be configured and/or directionally oriented to receive a second RF signal 122 emitted from an underground non-metallic pipe 116. At least a portion of second RF signal 122 may comprise at least one RF signal emitted from an electrostatic charge collected on non-metallic pipe 116 from flux 120 being the rate of flow of fluid 118 through an inner wall surface of chamber 130 of underground non-metallic pipe 116. For example, the flow of fluid 118 may facilitate a proton/electron exchange through chamber 130 of underground non-metallic pipe 116 to cause collection of the charge.

While the particular implementation of FIG. 1 depicts first antenna 104 and second antennas 106. One or more antennas to receive first RF signal 110 and second RF signal 122, it should be understood that one or more antennas such as, first and second antennas need not be physically distinct devices. A single physical antennal may function as first antenna 104 to receive first RF signal 110 and function as second antenna 106 to receive second RF signal 122. In one example, a single physical antenna device may be configured to receive first RF signal 110 for a first sample duration followed by receipt of second RF signal 122 in a second sample duration following the first sample duration. In another example, a single physical antenna may simultaneously form multiple directed beams to receive first RF signal 110 and second RF signal 122 in the same sample duration.

In one implementation, a PVC pipe may be negatively charged due to an orientation of PVC polymers forming the PVC pipe. Water has two positively charged hydrogen atoms and one negatively charged oxygen atom. As water flows through a PVC pipe, for example, positive charges from water molecules may be attracted to a negatively charged chamber wall surface of the PVC pipe. The positive charges may separate as the water flows through the chamber of the PVC pipe to provide a triboelectric charge collected within the chamber of the PVC pipe. As a result of this triboelectric charge collected during flow of water in the chamber, signal strength of an RF signal emitted from the PVC pipe may increase. In an embodiment, this increase in signal strength may be detected by electrostatic detection device 100.

Thus, underground non-metallic pipe 116 may be detected from the surface of the ground using electrostatic detection device 100 to collect ambient RF signals and RF signals from the ground. Measuring a gain or a change in the gain applied to the ambient signal from the triboelectric charge and as measured from the signal emitted from the ground. The collected RF signal data may correspond with pipe characteristics to generate data 126. It is within the scope of this embodiment for data 126 to include, but not be limited to, gain, a change in gain, and/or at least a portion of RF signal signature 128 displayed on display 124 to a user (not shown) in real-time.

Housing 102 may enclose a display 124 electrically connected to circuitry 114. In an embodiment, housing 102 may also contain visual indicator 132. Visual indicator 132 may include, for example, a light emitting diode configured to illuminate responsive to threshold logic 208 (FIGS. 2 and 3) detecting a presence of underground non-metallic pipe 116. In another embodiment, audio indicator 134 may include, for example, a speaker configured to generate a sound responsive to threshold logic 208 detecting a presence of underground non-metallic pipe 116.

Figure 2:
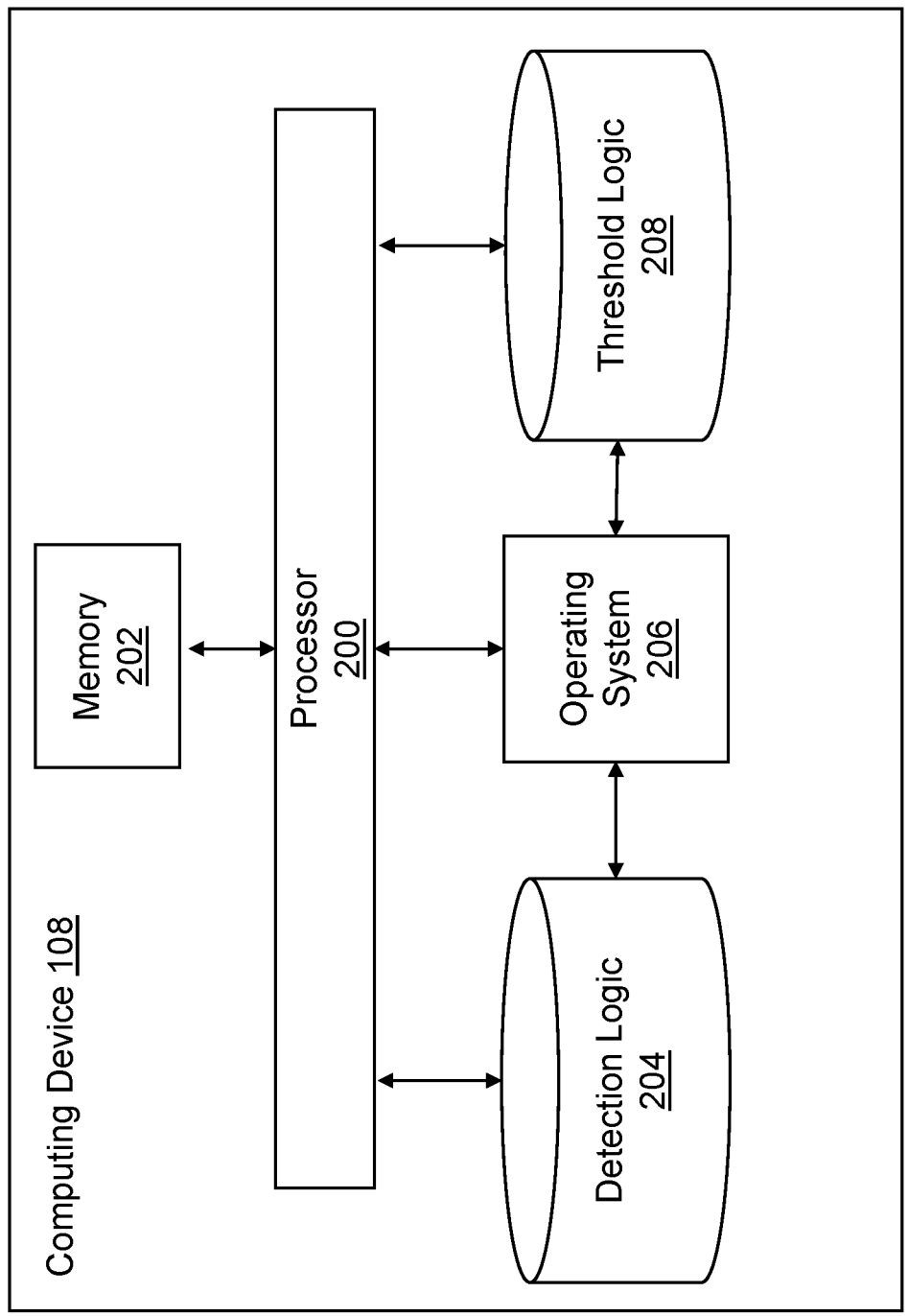
FIG. 2 is a schematic block diagram illustrating components of a computing device, in accordance with an embodiment.

Referring now to FIG. 2, computing device 108 has a processor 200 and operating system 206. Processor 200 may be coupled to memory 202 through a bus (not shown). In one implementation, detection logic 204 and threshold logic 208 may be performed by execution of instructions by computing device 108. In another implementation, detection logic 204 and/or threshold logic 208 may be implemented, at least in part, by one or more application specific integrated circuit devices and/or field programmable gate array devices. According to an embodiment, such a bus coupled to processor 200 and memory 202 may also be coupled to RF receiver 112 (FIG. 1). In an implementation, RF receiver 112 may comprise circuitry (not shown) to implement a heterodyne receiver that is tunable to process an RF signal at selected frequency bands. RF receiver 112 may further include circuitry to process such an RF signal at a selected frequency band (e.g., frequency band of a strongest received ambient signal) to provide a numerical (e.g., digital) measurement of received signal strength, such as a received signal strength indication (RSSI), using analog-to-digital sampling circuitry, for example. Such measurements of received signal strength may be obtained by a bus coupled to computing device 108 and memory 202 to be stored in memory 202 for subsequent processing by computing device 108 according to detection logic 204 and/or threshold logic 208, for example.

Referring now to FIG. 3, memory 202 may store RF signal strength profile 306, pipe characteristics 308, and/or at least a portion of electrostatic pattern signature 310. In one embodiment, RF signal strength profile 306, pipe characteristics 308, and/or electrostatic pattern signature 310 may be determined as parameters or a matched filter adapted for pattern recognition. In another embodiment, RF signal strength profile 306, pipe characteristics 308, and/or electrostatic pattern signature 310 may be expressed as weights to be applied at activation functions of a neural network determined using machine learning operations. RF signal strength profile 306 may include a database of machine learning training data of one or more RF signal measurements. In a particular application, detection logic 204 and/or threshold logic 208 may apply RF signal strength profile 306, pipe characteristics 308, and/or electrostatic pattern signature 310 to infer pipe location and/or pipe characteristics based on RF signal strength measurements.

FIG. 3 illustrates at least one measurement 312 to be processed by computing device 108 from RF receiver 112, for example. Processor 200 may, in combination with detection logic 204 and/or threshold logic 208, provide underground pipe detection and/or characteristic indications. In an implementation, detection logic 204 may include signature pattern identifier 300 to apply an electrostatic pattern signature to at least one measurement 312 to characterize and/or measure a parameter of the underground non-metallic pipe. In one aspect, such an electrostatic pattern signature 310 may apply such an electrostatic pattern signature to a measured gain applied of an ambient signal over time. At operation 304, a match with at least one predetermined parameter from database 302 may be determined using threshold logic 208, for example.

In one implementation, a gain imparted by triboelectric charge collected on an underground non-metallic pipe to an ambient RF signal ($gain_{AG}$) may be computed according to expression (1) as follows:

$$gain_{AG} = 10\log_{10}\left[\frac{RSSI_G(f_A^{max})}{RSSI_A(f_A^{max})}\right] dB, \quad (1)$$

where:

$f_A^{max}$ is a frequency band of a strongest detected ambient RF signal;

$RSSI_A(f_A^{max})$ is a received signal strength indication of the strongest detected ambient RF signal (e.g., received at a first antenna) at frequency band $f_A^{max}$, and $RSSI_G(f_A^{max})$ is a received signal strength indication of an RF signal emitting from the ground (e.g., received at a second antenna) at frequency band $f_A^{max}$.

In one implementation, $f_A^{max}$ may be in a broadcast AM portion of an ambient RF spectrum (e.g., 540 kHz to 1700 kHz). In other implementations, $f_A^{max}$ may be in other portions of an ambient RFs is a frequency band of a strongest detected ambient RF signal such as, for example, a broadcast FM portion of the ambient RF spectrum.

According to embodiments, FIGS. 4A, 4B, 5A and 5B illustrate operational scenarios of electrostatic detection device 100 at different time instances. Measurements and/or inferences derived from measurements obtained at such time instances are provided in visual messages 400, 404, 500 and 504. In the scenarios of FIGS. 4A, 4B, 5A and 5B, first antenna 104 of electrostatic detection device 100 may be positioned to receive an ambient RF signal. For example, first antenna 104 may be maintained in a substantially upright position while directed towards the sky. It should be understood, however, that first antenna 104 need not necessarily be maintained in any particular position to receive a dominant ambient RF signal, and that claimed subject matter is not limited in this respect. Second antenna 106 may be positioned to receive an RF signal emitted from ground 408 (e.g., emitted from electrostatic charge formed on underground non-metallic pipe 116). For example, second antenna 106 may be maintained in a position directed towards the surface of ground 408. It should be understood, however, that second antenna 106 need not necessarily be maintained in any particular position to receive an RF signal emitted from an underground non-metallic pipe, and claimed subject matter is not limited in this respect.

According to an embodiment, results of application of detection logic 204 and/or threshold logic 208 may be stored as data 126. In FIGS. 4A, 4B, 5A and 5B, a visual message may be shown to an operator on display 124 based, at least in part, on data 126, for example. Such a visual message may include multiple segments and/or fields to summarize an analysis of received first RF signal 110 and second RF signal 122. In the particular illustrated embodiment, such fields include "Pipe Status" (e.g., to indicate detection of a non-metallic pipe), "Signal Strength" (e.g., to indicate a measured RSSI of second RF signal 122 and/or a gain applied to a measured RSSI of first RF signal 110 as measured in a measured RSSI of second RF signal 122), "Pipe Depth" (e.g., to indicate a depth of a detected non-metallic pipe) and "Pipe Diameter" (e.g., to indicate a measured diameter of a detected non-metallic pipe). It should be understood, however, that these are merely examples of segments and/or fields that may be provided in a visual message to an operator of electrostatic device 100, and claimed subject matter is not limited in this respect. In other embodiments, fields presented on display 124 may identify and/or characterize detected objects as "Metallic Pipe," "Non-Metallic Pipe," "Wire," "Coin," "Trash," "Leak," "Gold," "Silver," "Copper," just to provide a few examples. In an implementation, these identities and/or characterizations may be inferred by detection logic 204 and/or threshold logic 208 using techniques discussed herein.

A value displayed in segment and/or field "Signal Strength" may comprise a difference and/or ratio between two RF signal strengths expressed as a gain in dB (e.g., $gain_{AG}$). In another embodiment, such a difference and/or ratio may be expressed as a subtraction of signal strength magnitudes. In an implementation, material making up an underground non-metallic pipe (e.g., plastic) may have a greater density/concentration of electrons relative to protons. Such plastic material may be negatively charged while liquid flowing through the pipe has positive charges that are attracted to the pipe, resulting in a build up of an electrostatic charge. Parameters displayed/shown in segments and/or fields "Pipe Status," "Pipe Diameter" and "Pipe Depth" may be determined at least in part by detection logic 204 and/or threshold logic 208 as inferences based on raw measurements of RSSI of first RF signal 110 and/or second RF signals, and/or as inferences based on signal strength determined as a difference and/or ratio between two RF signal strengths expressed as a gain. Such inferences may also be determined by detection logic 204 and/or threshold logic 208 as inferences based on observations in changes in such raw measurements and/or signal strength over a time duration. In one embodiment, detection logic 204 and/or threshold logic 208 may employ digital pattern recognition applying matched filters to raw measurements of RSSI of first RF signal 110 and/or second RF signals, and/or signal strength to infer values to be displayed in segments and/or fields for "Pipe Status," "Pipe Diameter" and "Pipe Depth."

In another embodiment, detection logic 204 and/or threshold logic 208 may be implemented as one or more neural networks to receive raw measurements of RSSI of first RF signal 110 and/or second RF signals and/or signal strength determined as a difference and/or ratio between two RF signal strengths expressed as a gain in an input tensor. Based on such values in an input tensor, such one or more neural networks may provide inference values in an output tensor to be used in populating segments and/or fields "Pipe Status," "Pipe Diameter" and "Pipe Depth." Such a neural network implementing detection logic 204 and/or threshold logic 208 may comprise, for example, a convolutional neural network (CNN) with weights applied at activation functions implemented at nodes of the CNN. Such weights may be determined in training operations applied to ground truth observations paired with corresponding receive raw measurements of RSSI of first RF signal 110 and/or second RF signals and/or signal strength determined as a difference and/or ratio between two RF signal strengths expressed as a gain and using backpropagation techniques.

Figure 4A:
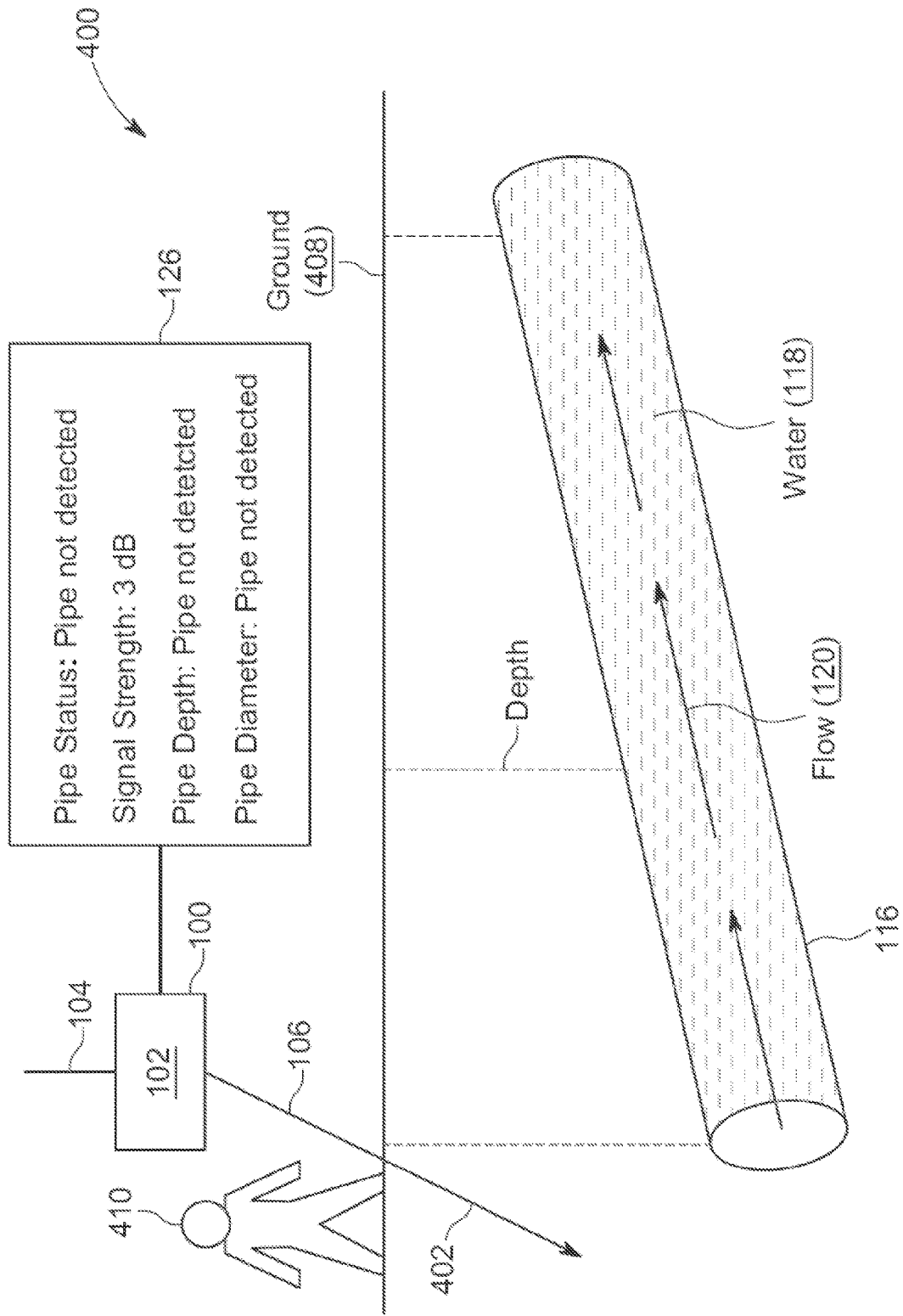
FIGS. 4A and 4B are schematic diagrams of applications to detect and/or characterize an underground non-metallic pipe retaining a fluid comprising water, in accordance with an embodiment.

In the particular scenario of FIG. 4A, flow and/or flux 120 of fluid 118 within underground non-metallic pipe 116 may comprise water that contributes to generation of charged particles forming on underground non-metallic pipe 116. Collection of such charged particles on underground non-metallic pipe 116 may emit an amplification of the ambient RF signal to impart a gain that may be measured and quantified by electrostatic detection device 100 (e.g., according to expression (1)) as discussed above. In one embodiment, detection logic 204 and/or threshold logic 208 may indicate certain detections and/or characterizations of a non-metallic pipe responsive to a signal strength value exceeding a threshold condition. Such a signal strength value may comprise a measured RSSI of second RF signal 122 and/or a gain applied to a measured RSSI of first RF signal 110 as measured in a measured RSSI of second RF signal 122, for example. Segments and/or fields of visual message 400 on display 124 may indicate a signal strength of 3.0 dB. Likewise in the scenario of FIG. 5A, segments and/or fields of visual message 500 on display 124 may indicate a signal strength of 1.0 dB. If these signal strength indications do not exceed a threshold condition for detection of a non-metallic pipe, remaining segments and/or fields of visual messages 400 and 500 may indicate "pipe not detected."

Figure 4B:
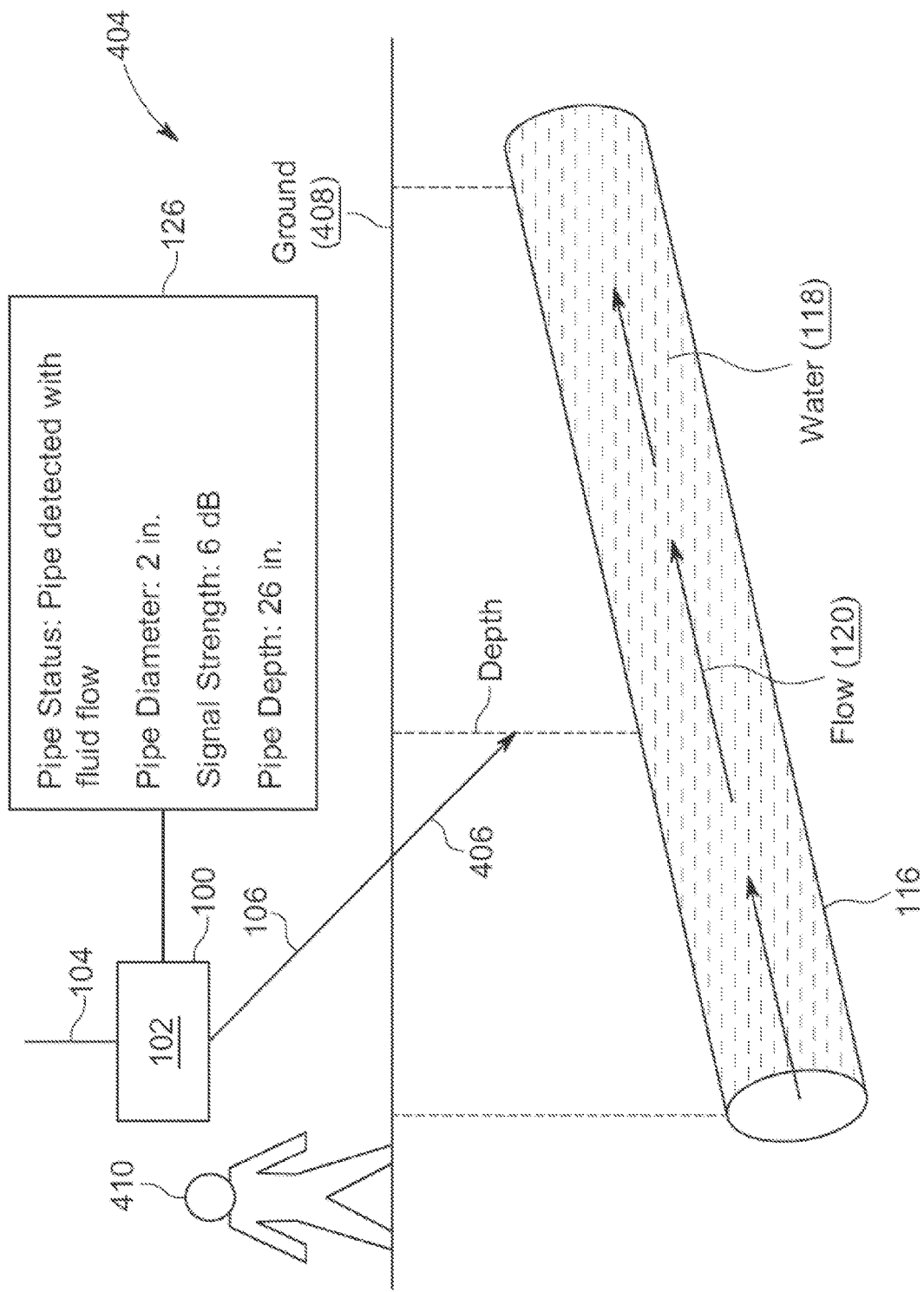

In the scenario of FIG. 4B, a flow and/or flux 120 of fluid 118 within underground non-metallic pipe 116 comprising water may impart collection of charged particles that emit an RF signal that may be detected and processed by the system of electrostatic detection device 100. Visual message 404 of FIG. 4B indicates a signal strength of 6.0 dB. If detection logic 204 and/or threshold logic 208 determine that this signal strength exceeds a threshold condition, for example, additional segments and/fields of visual message 404 may provide additional analysis results such as detection of a presence of fluid flow in a non-metallic pipe, a pipe diameter of two inches and/or pipe depth of 26 inches.

Figure 5A:
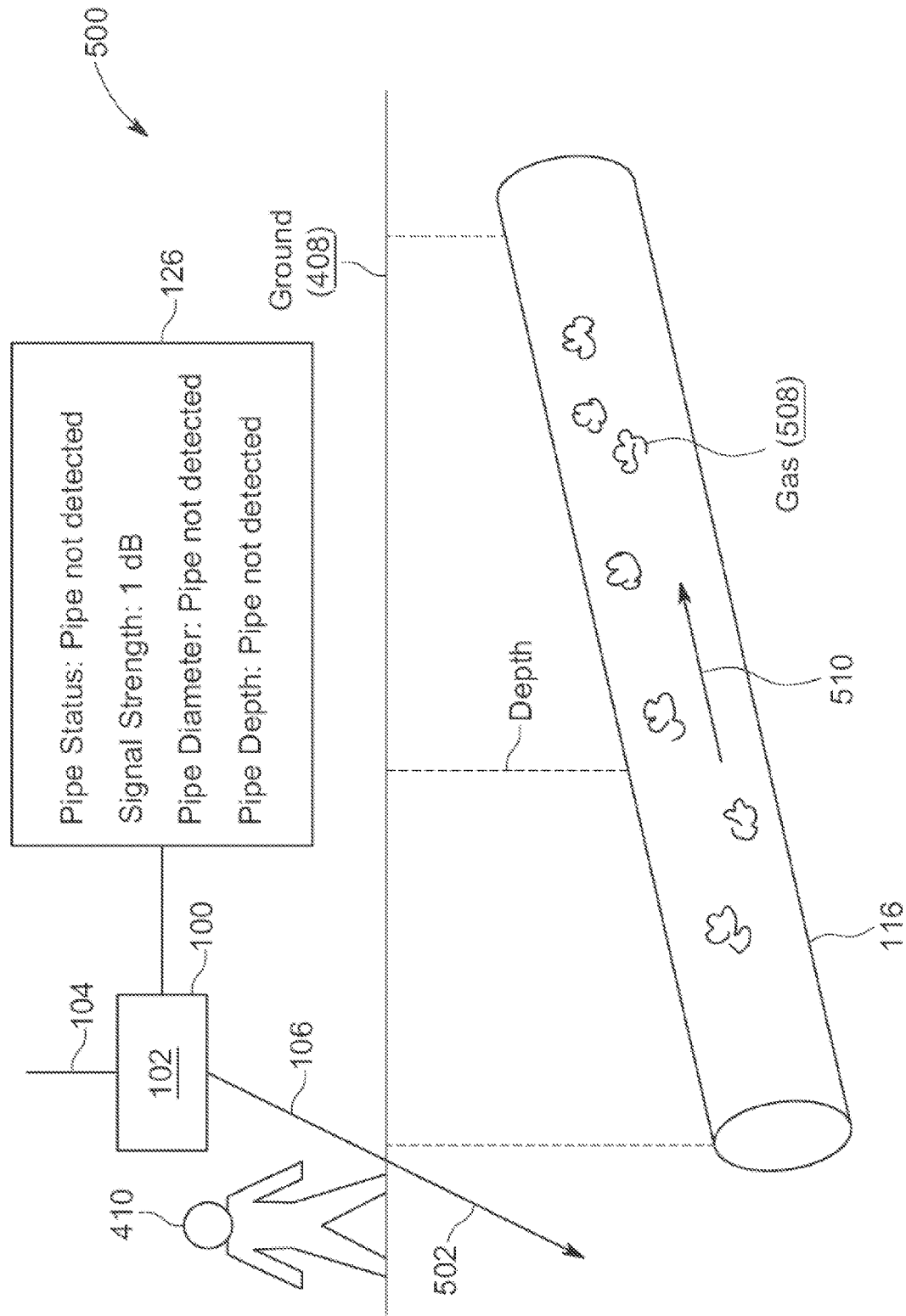
FIGS. 5A and 5B are schematic diagrams of applications to detect and/or characterize an underground non-metallic pipe retaining a fluid comprising gas, in accordance with an embodiment.

In the scenario of FIG. 5A, underground non-metallic pipe 116 may retain a flowing fluid being gas. Here, an electrostatic charge may collect on non-metallic pipe 116 from flow of a fluid in non-metallic pipe 116 being a gas. A presence of an electrostatic charge collected on underground non-metallic pipe 116 may emit an RF signal as an amplification of an ambient RF signal to impart a gain be detected and processed by electrostatic detection device 100.

In the scenario of FIG. 5A, changes in RF signal strength may be caused by changes in a density of electrostatic charges collecting on underground non-metallic pipe 116. While electrostatic charges accumulate on underground non-metallic pipe 116, such electrostatic charges may be measured using electrostatic detection device 100. In one aspect, changes in an RF signal strength emitted from non-metallic pipe 116 as measured by electrostatic device 100 may occur over time. Such changes may be measured, for example, while electrostatic detection device 100 is positioned to receive at two different locations an RF signal emitted from underground non-metallic pipe 116 at two different instances. In another example, while the electrostatic detection device 100 is positioned to receive an RF signal from a location over underground non-metallic pipe 116 while gas flows through underground non-metallic pipe 600 at two different locations at two different instances. In one example of the scenario of FIG. 5A, gas particles disposed within non-metallic pipe 16 located at a first end of non-metallic pipe 116 at a first instance may flow to a second, opposite end of non-metallic pipe 116 at a second time instance. Affecting an amount or density of charge collecting on non-metallic pipe on any particular location, the gas particles may likewise affect a detectable strength in a signal emitted from non-metallic pipe 116 at any particular location. Measurements of signal strength of RF signals emitted from different locations of non-metallic pipe 116 at different times may be provided as input values to detection logic 204 and/or threshold logic 208 to infer values and/or characteristics for segments and/or fields "Pipe Status," "Pipe Diameter" and "Pipe Depth" of message 500, for example.

Figure 5B:
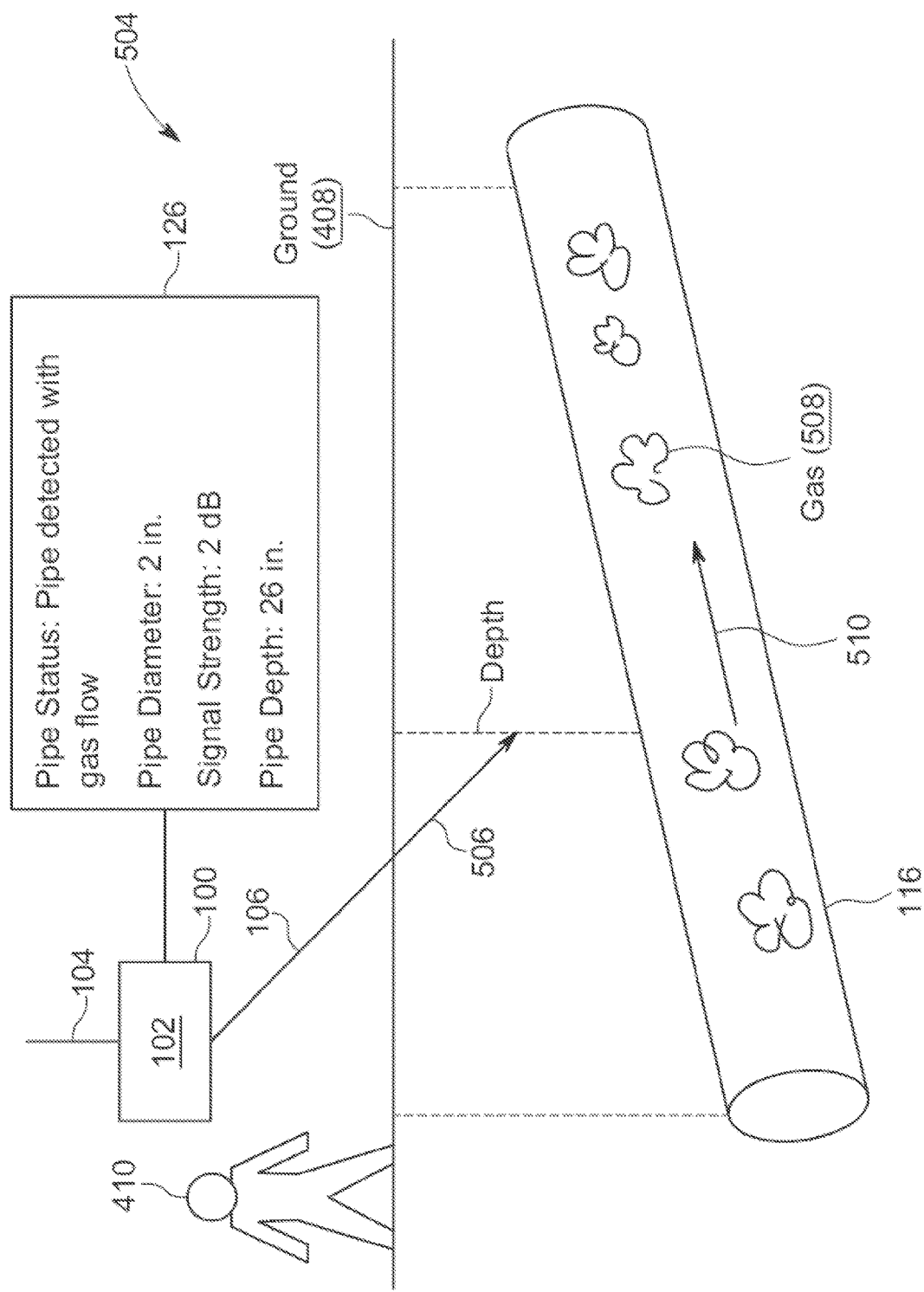

According to an embodiment, flow of gas within a chamber of the pipe may cause electrostatic charges to emit an amplification of the ambient RF signal to impart a gain. Also, flowing gas in an operational underground non-metallic pipe containing particulate matter in the form of including, but not limited to, scale, rust, and/or dirt may generate static electricity that emits an amplification of the ambient RF signal to impart a detectable gain. Other causes of static charge include gas flow disrupters such as pipe elbows, valves, neckdowns, and leaks. Even water flowing through a plastic pipe may build an electrostatic charge. In an implementation, detection logic 204 and/or threshold logic 208 may be configured to detect such features based, at least in part, on measurements of RSSI of an ambient RF signal and RF signal emitted from underground over time. In the scenario of FIG. 5B, underground non-metallic pipe 116 is retaining a flowing fluid being gas. Here, an electrostatic charge may collect on underground non-metallic pipe 116 from a flow of the gas in underground non-metallic pipe 116. In some scenarios, while gas flows through underground non-metallic pipe 116, particulate matter (not shown) such as, for example, scale, rust, and/or dirt may also flow within a chamber of the underground non-metallic pipe 116. At least a portion of the flow of this particulate matter may contribute to collection of a static charge on underground non-metallic pipe 116. Visual message 504 of FIG. 5B indicates a signal strength of 2.0 dB. If detection logic 204 and/or threshold logic 208 determine that this signal strength exceeds a threshold condition, additional segments and/or fields of visual message 404 may provide additional analysis results such as detection of a presence of gas flow in a non-metallic pipe, a pipe diameter of two inches and/or pipe depth of 26 inches.

Figure 6A:
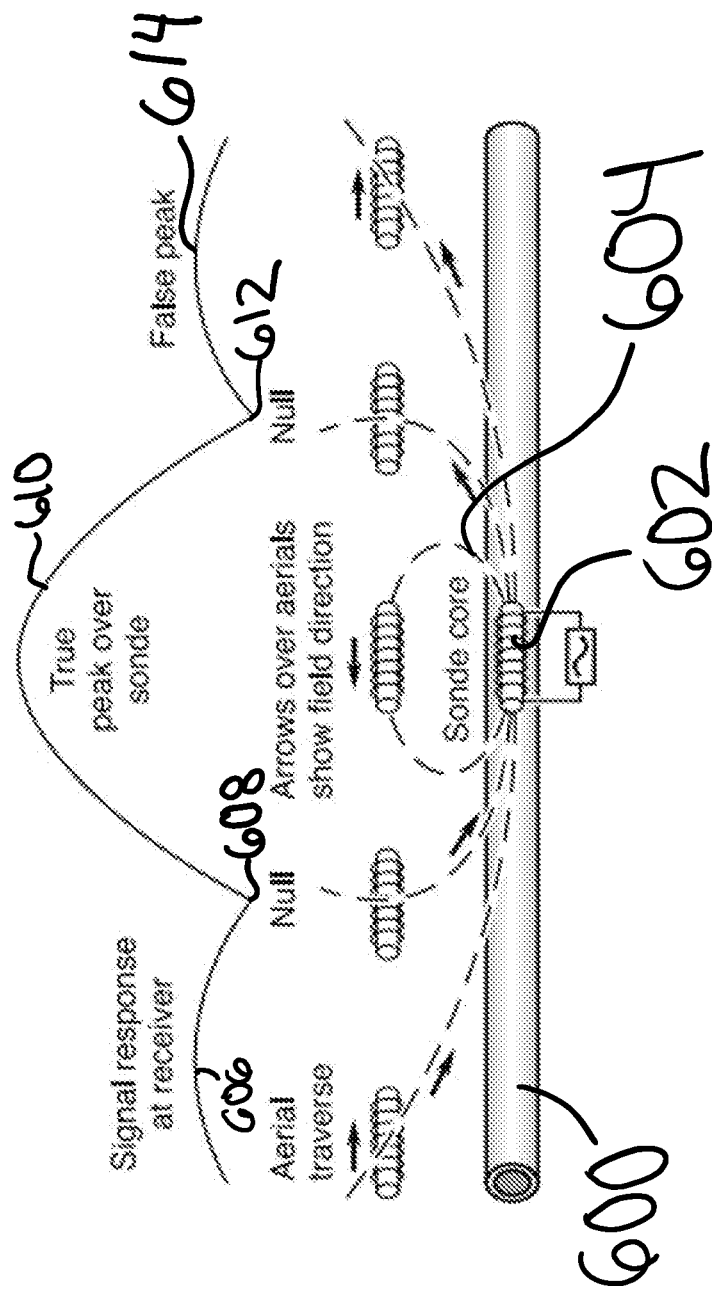
FIGS. 6A and 6B are schematic diagrams of electrostatic charges being emitted from an underground non-metallic pipe in an application in which the RF signal strength of the electrostatic charges are processed to detect and/or characterize the underground non-metallic pipe, in accordance with an embodiment.

FIG. 6A illustrates an example of how RF signals are generated from an underground non-metallic pipe 600. The RF signals shown in FIG. 6A are measured by the electrostatic detection device. The measured values are processed by various signal processing methods for detecting and/or characterizing underground non-metallic pipe 600. Sonde core 602 produces a field distribution 604 which is not cylindrical as with a line, but having a substantially sausage shape in the direction of sonde core 602. Leading peak 606 is shown as sonde core 602 is approached with a horizontal aerial, wherein a rising signal will be detected as a signal comes within range. First null value 608 is shown when leading peak 606 then falls off again to a null value. When a signal value is null, that may give an impression to a user that a signal has been passed. Maximum amplitude peak 610 is shown. If the traverse is continued, the signal will rise again to a much higher level, the peak of which is above the sonde at a maximum amplitude. Second null value 612 is shown. When the signal then falls to null again. Trailing peak 614 is shown as a small rise in signal amplitude occurs before it fades away.

The small peaks in detected RF signal strength shown at leading peak 606 and at trailing peak 614 being located on either side of null readings in which a low RF signal strength is detected at first null value 608 and at second null value 612. It is essential to find maximum amplitude peak 610 between first null value 608 and second null value 612 to pinpoint the location of sonde core 602. The reason for the first null value 608 and the second null value 612 is that the field reverses its direction through the aerial core at each end of the travers. At the point of reversal, the field crosses the core at right-angles, so there is no signal (null) at these points. The distance between the nulls increases with depth of the sonde. A vertical aerial, however, will produce a single null over the sonde but this null will exist anywhere along a line extending to both sides of the pipe.

Figure 6B:
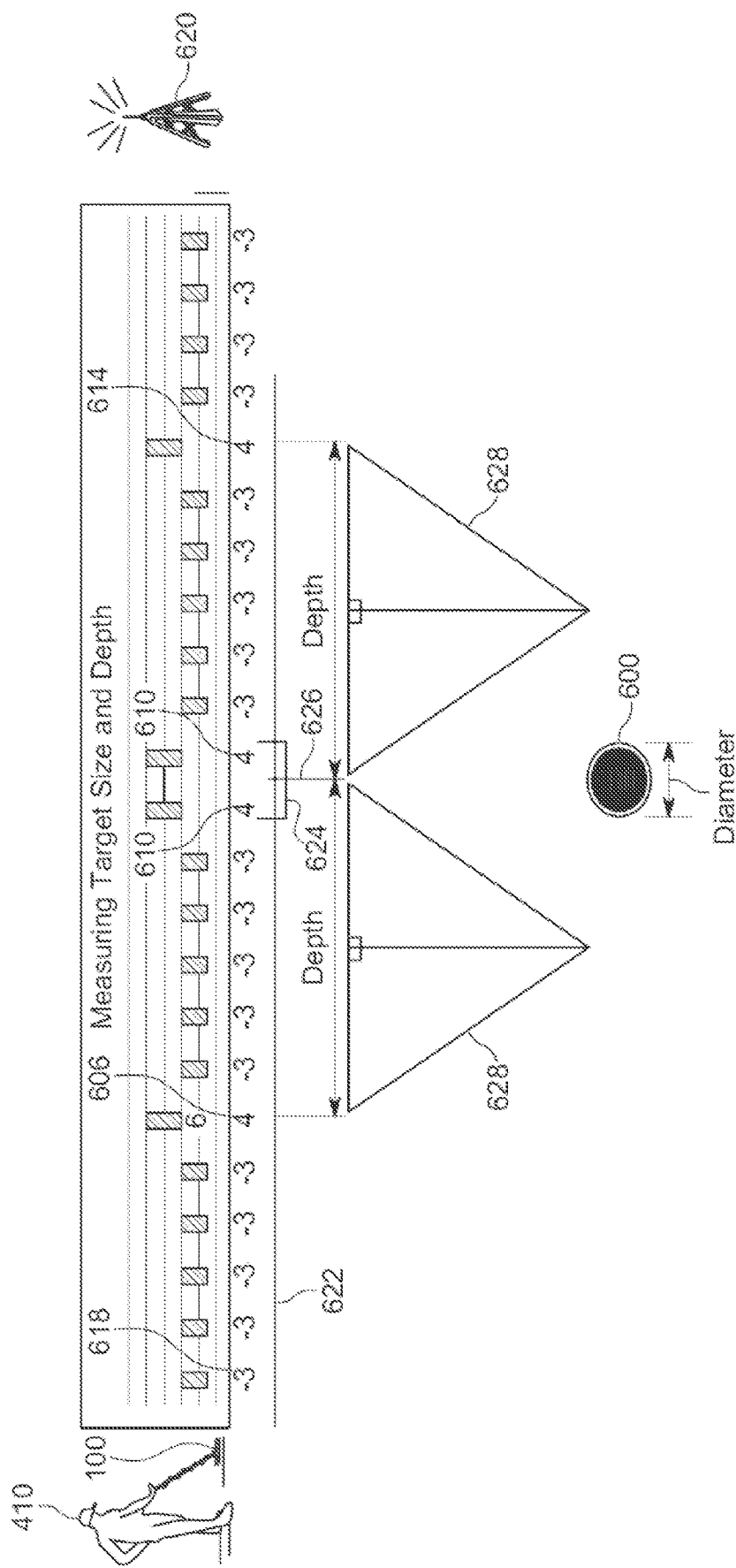

FIG. 6B illustrates the RF signal strength measurements of an underground non-metallic pipe as electrostatic detection device 100 passes over an area of the ground surface over time. The electrostatic detection device 100 may be configured for detection of underground non-metallic pipe 600 retaining fluid such as water. In one embodiment, detection logic 204 and/or threshold logic 208 may respond to changes in ambient radio transmission signal 618 strength/gain. In this example, ambient radio transmission signal 618 strength/gain is detected at −3 dB. In particular, ambient radio transmission signal 618 strength/gain emitted from below the surface of ground 622 is measured as being −3 dB without an underground non-metallic pipe being detected. RF transmissions 620 in an area influence the triboelectric charge collected on non-metallic pipe 600 causing the triboelectric charge to oscillate at the same frequency as RF signal transmissions 620. Such a triboelectric charge may impart an increase to a measured radio signal strength in an area over underground non-metallic pipe 600.

As electrostatic detection device 100 is moved to survey a surface above ground 622, changes in strength/gain of ambient radio transmission signal 618 emitted from below surface of ground 622 may be measured. In the presently illustrated embodiment, electrostatic detection device 100 may be moved over ground 622 from before at least a point above ground 622 where a leading peak 606 is detected to past at least a point above ground 622 where a training peak 614 is detected. Pipe location 626 may be determined by observing a sustained peak 624 in an overall radio signal strength/gain. In this example, sustained peak 624 is shown as having two values of 4 dB as electrostatic detection device 100 passes over surface of ground 622 at pipe location 626 Electrostatic detection device 100 detecting a leading peak 606 and a trailing peak 614 of the sample. Maximum amplitude peak 610 is located between a leading peak 606 and a trailing peak 614. At maximum amplitude peak 610, pipe location 626 of underground non-metallic pipe 600 may be displayed to user 410 in real time. Once underground non-metallic pipe 600 is initially detected, a length of non-metallic pipe 600 may be tracked by orienting a directional antenna of electrostatic detection device 100 while scanning to continuously detect leading peak 606, maximum amplitude peak 610, and trailing peak 614. For example, such a directional antenna may be moved back and forth in a direction substantially orthogonal to an expected path of initially detected underground non-metallic pipe 600 while user 410 travels along the expected path. Adjustments in the expected path may then be made based on where leading and trailing peaks are detected. Detections of leading peak 606, maximum amplitude peak 610 and/or trailing peak 614 along a path traveled by user 410 may then be used to mark an actual detected/measured path of underground non-metallic pipe 600. While measured signal strength/gain values for leading and trailing peaks may change over time, relative differences between signal strength/gain values measured while over areas with no non-metallic pipe and peak values may be sufficient to accurately track the path of non-metallic pipe 600.

In another embodiment, FIG. 6B shows aspects of a technique that may be used to determine a diameter of underground non-metallic pipe 600 by measuring a distance over which a peak signal strength/gain is sustained. In particular, a distance measured from the leading peak 606 of a maximum amplitude peak 610 to trailing peak 614 may be used to determine a characteristic of underground non-metallic pipe 600 such as, for example, a diameter. Additionally, a depth of underground non-metallic pipe 600 may be measured by orienting a directional antenna of electrostatic detection device 100 while user 410 walks backwards from pipe location 626 where sustained peak 624 is detected to a location where leading peak 606 is detected. Using the principle that the two right angle sides of isosceles triangles 628 are equal, a depth may be determined at least in part by measuring the distance from leading peak 606 when walking backwards to sustained peak 624. Likewise, the depth may be determined at least in part by measuring the distance from sustained peak 624 walking forward to trailing peak 614. The distance measured between these two points is the depth of underground non-metallic pipe 600.

Figure 7:
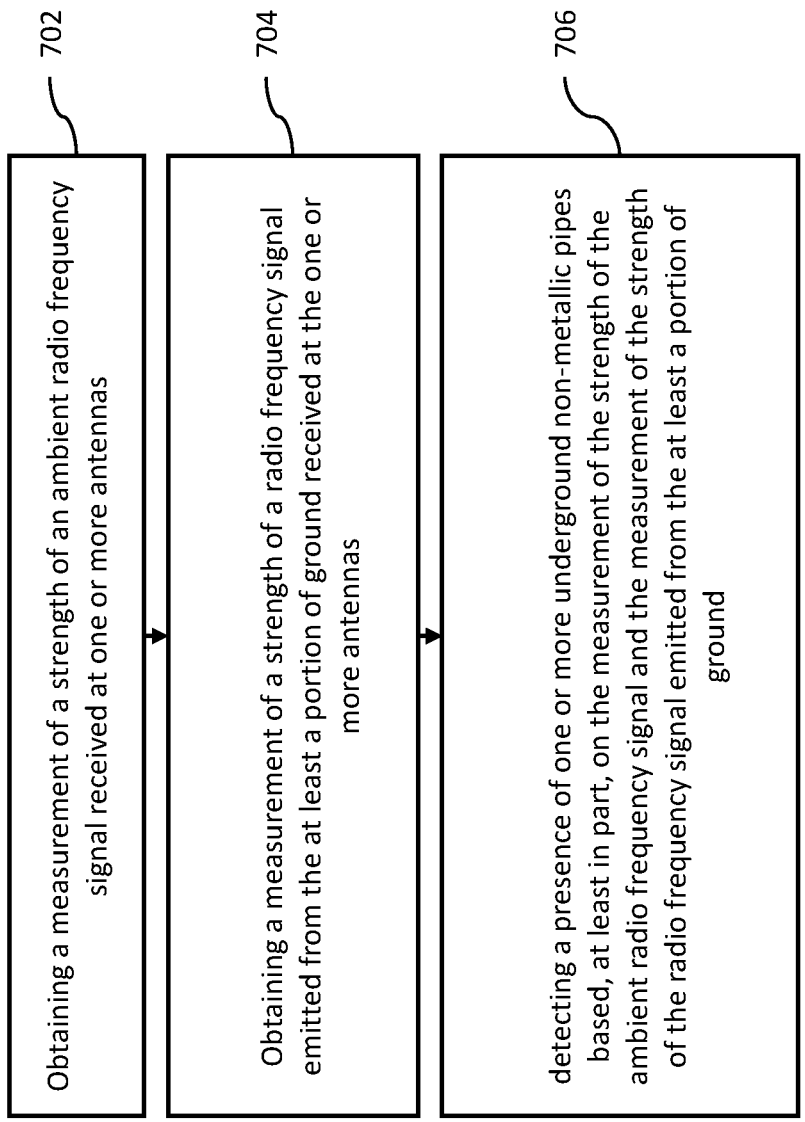
FIG. 7 is a flow diagram of a process for detecting a presence of an underground non-metallic pipe, according to an embodiment.

FIG. 7 is a flow diagram of a process 700 to detect a presence of a non-metallic underground pipe, according to an embodiment. Block 702 may comprise obtaining a measurement of a strength of an ambient RF signal received at a first antenna, such as first antenna 104. Such an ambient RF signal may comprise a dominant (e.g., locally broadcasted) AM signal. Block 704 may comprise obtaining a measurement of a strength of an RF signal emitted from the at least a portion of ground received at a second antenna, such as second antenna 106. As pointed out above, such an RF signal emitted from the ground may comprise an RF signal powered by a triboelectric charge formed on a non-metallic (e.g., plastic) pipe. Also as pointed out above, the RF signal received at second antenna 106 may be powered by such triboelectric charge to effectively comprise application of a gain to the RF signal received at first antenna 104. Measurements obtained at block 702 and block 704 may be obtained, for example by processing raw signals received at first antenna 104 and second antenna 106 at circuitry to implement RF receiver 112, for example.

Block 706 may comprise detecting a presence of one or more underground non-metallic pipes based, at least in part, on a difference between the measurement of the strength of the ambient radio RF signal received at block 702 and the measurement of the strength of the RF signal received at block 704. In one embodiment, such a difference may be computed as a numerical subtraction of power measurements obtained at respective block 702 and block 704. In another embodiment, such a difference may be computed as a gain such as gain $\text{gain}_{AG}$ computed according to expression (1), for example. In one implementation, all or a portion of block 706 may be performed by a computing device 108. In another implementation, portions of block 706 may be performed by hardwired circuitry configured to process signal strength measurements expressed as signal magnitudes to provide an indication of a presence of an underground non-metallic pipe.

According to an embodiment, detection of a presence of one or more underground non-metallic pipes at block 706 may be used to provide input signals to display 124 and/or audio indicator 134 to communicate to an operator. Also, as pointed out above, performance in detection of an underground non-metallic pipe may be enhanced by varying a flux of a substance (e.g., containing liquid or gaseous fluid) and measuring changes to a difference in signal strengths received at the block 702 and at block 704 responsive to the varied flux.

In another aspect, a diameter, length or depth of at least one of the one or more underground non-metallic pipes, or a combination thereof may be measured and/or characterized based, at least in part, on the difference between measurements of signal strength determined at block 706. In one example, a diameter of the underground non-metallic pipe may be measured and/or characterized based, at least in part, on a measurement of a distance over which a peak in the difference in signal strength is maintained. In another example, a length of the underground non-metallic pipe may be measured and/or characterized based, at least in part, on detection of a first sustained peak in gain and orienting the second antenna at least a portion of 180 degrees until a second sustained peak in the RF signal strength is detected. In yet another example, referring again to at least FIGS. 6A and 6B, a depth of the underground non-metallic pipe may be measured and/or characterized based, at least in part, on a measured distance from a leading peak in gain to a sustained peak in the RF signal strength.

Figure 8A:
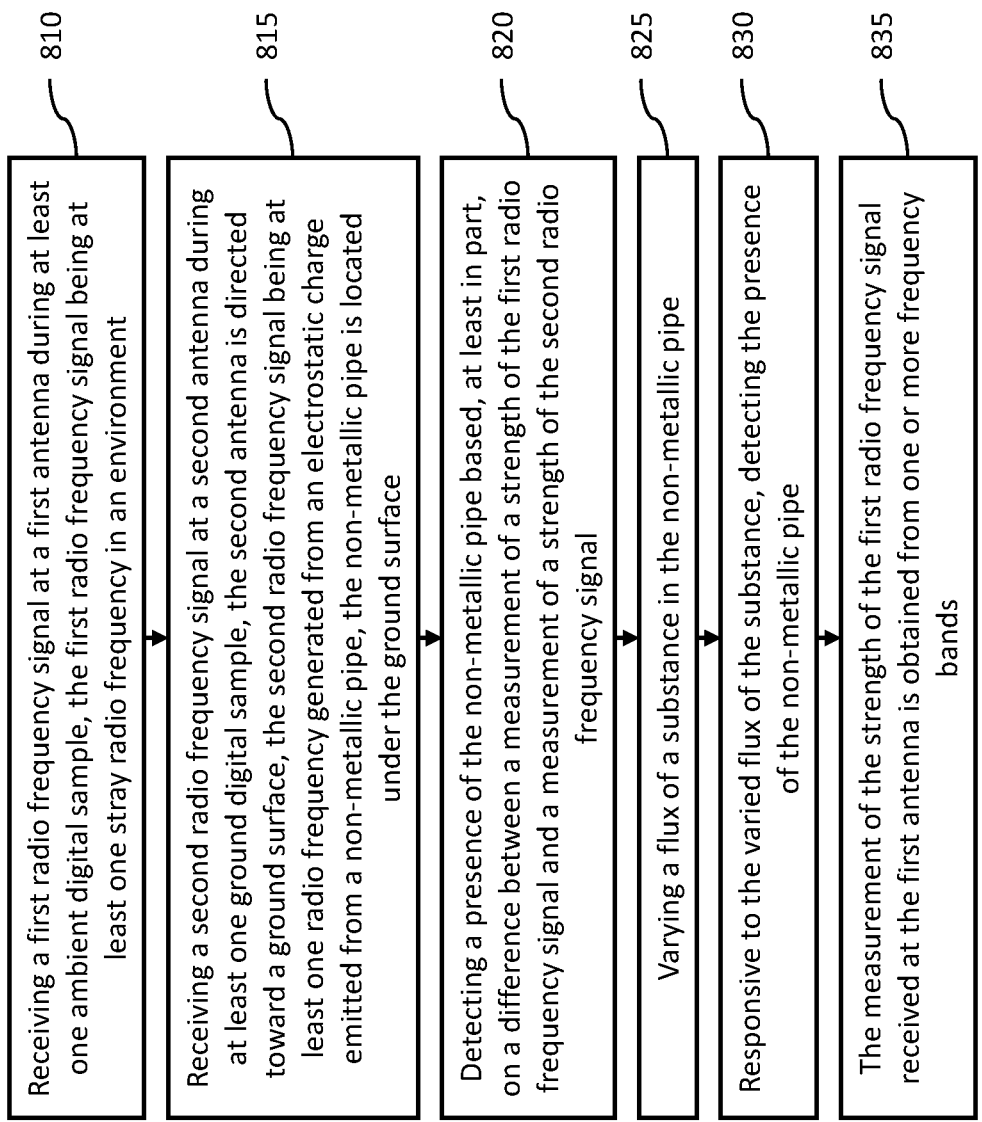
FIGS. 8A and 8B are a flow diagram of a process for detecting/characterizing an underground non-metallic pipe, in accordance with an embodiment.
Figure 8B:
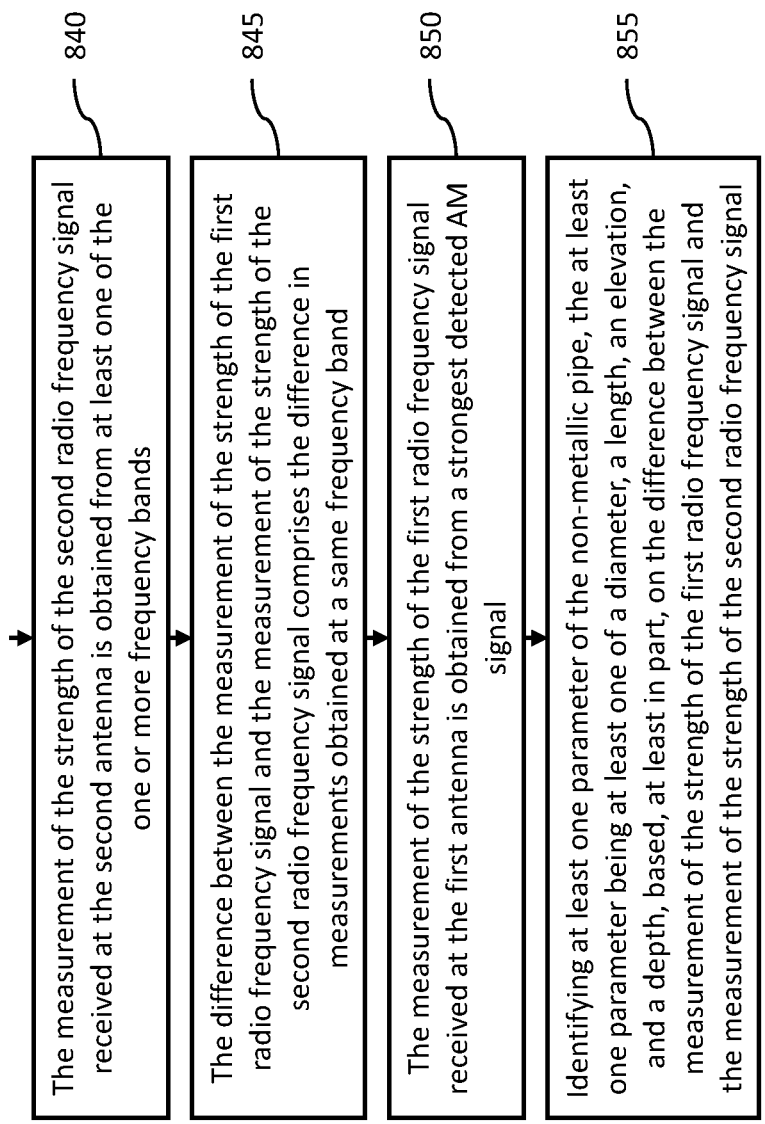

FIGS. 8A and 8B illustrate a method for detecting an underground non-metallic pipe, according to an embodiment. At block 810, receiving a first RF signal may be received at a first antenna. At block 815, a second RF signal may be received at a second antenna while the second antenna is directed toward a ground surface, the second RF signal being at least one RF generated from an electrostatic charge emitted from an underground non-metallic pipe, the underground non-metallic pipe is located under the ground surface. At block 820, detecting a presence of the underground non-metallic pipe based, at least in part, on a difference between a measurement of a strength of the first RF signal and a measurement of a strength of the second RF signal. At block 825, varying a flux of a fluid in the underground non-metallic pipe. At block 830, responsive to the varied flux of the fluid, detecting the presence of the underground non-metallic pipe. At block 835, the measurement of the strength of the first RF signal received at the first antenna is obtained from one or more frequency bands.

Referring now to FIG. 8B, at block 840, the measurement of the strength of the second RF signal received at the second antenna is obtained from at least one of the one or more frequency bands. At block 845, the difference between the measurement of the strength of the first RF signal and the measurement of the strength of the second RF signal comprises the difference in measurements obtained at a same frequency band. At block 850, the measurement of the strength of the first RF signal received at the first antenna is obtained from a strongest detected AM signal. At block 855, identifying at least one parameter of the underground non-metallic pipe, the at least one parameter being at least one of a diameter, a length, an elevation, and a depth, based, at least in part, on the difference between the measurement of the strength of the first RF signal and the measurement of the strength of the second RF signal.

Various implementations of the systems and techniques described here can be realized in electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

While this specification contains many specific implementation details, these should not be construed as limitations on the scope of the disclosed technology or of what may be claimed, but rather as descriptions of features that may be specific to embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable sub combination. Moreover, although features may be described herein as acting in certain combinations and/or initially claimed as such, one or more features from a claimed combination can in some cases be excised from the combination, and the claimed combination may be directed to a sub combination or variation of a sub combination. Similarly, while operations may be described in a particular order, this should not be understood as requiring that such operations be performed in the particular order or in sequential order, or that all operations be performed, to achieve desirable results.

The power source (not shown) may be a battery and/or other rechargeable source. In some implementations, the electrostatic detection device 100 may include wiring that couples the electrostatic detection device 100 to operating system 206. Operating system 206, as described throughout this disclosure, can be in communication with a plurality input-output devices.

Signature pattern identifier 300 may be configured to determine the electrostatic flux signature pattern of an underground pipe to determine a location of the underground pipe. Detection logic 204 may be configured to interpret the identified electrostatic flux signature pattern and determine many characteristics of an underground pipe, which can indicate depth, elevation, material, diameter, and contents retained within the pipe. Once detection logic 204 determines information about at least one measurement 312, the identified information may be stored in memory 202.

In one aspect, an apparatus may comprise one or more RF receivers coupled to one or more associated antennae to process an ambient RF signal and an RF signal emitted from the ground. The apparatus may further comprise one or more processors to detect a presence of one or more underground plastic pipes based, at least in part, on a difference between a measurement of the strength of the ambient RF signal and a measurement of the strength of the RF signal emitted from the ground. In one implementation, the one or more processors may be coupled to a visual or audible alarm to alert an operator as to a detected presence of an underground plastic pipe.

In some aspects, the techniques described herein relate to an electrostatic detection system configured for detecting an effect of flux on a radio frequency signal signature when a fluid flows through a chamber of an underground non-metallic pipe, including: a housing, the housing including: circuitry, the circuitry including a central processing unit, the central processing unit having a memory, a detection logic, and a threshold logic; a radio frequency receiver, the radio frequency receiver is electrically connected to the circuitry; a first antenna, the first antenna is in electrical communication with the circuitry, the first antenna is configured to receive a first radio frequency signal of at least one ambient sample, the first radio frequency signal being at least one stray radio frequency in an environment; a second antenna, the second antenna is in electrical communication with the circuitry, the second antenna is oriented in a direction towards a surface of ground, the second antenna is configured to receive a second radio frequency signal from at least one ground sample, the second radio frequency signal being at least one radio frequency generated from an electrostatic charge emitted from at least one of a flow of the fluid through the chamber of the underground non-metallic pipe; and the central processing unit is configured to execute steps to direct the first antenna to the radio frequency receiver, the radio frequency receiver is configured to measure a value of the at least one ambient sample and send the value to the memory, in response to storing the value of the at least one ambient sample using the first antenna, the central processing unit directs the second antenna to the radio frequency receiver, the radio frequency receiver is configured to measure a value of the at least one ground sample and send the value to the memory, the detection logic is configured to compare the value of the at least one ambient sample to the value of the at least one ground sample and calculate a difference, the difference forming at least a portion of an electrostatic flux pattern signature.

In some aspects, the techniques described herein relate to a system, wherein the housing having a display, the display is electrically connected to the circuitry, the display is configured to display the at least a portion of the electrostatic flux pattern signature to a user.

In some aspects, the techniques described herein relate to a system, wherein the housing having a visual indicator, the visual indicator is configured to illuminate when the threshold logic detects a presence of the underground non-metallic pipe.

In some aspects, the techniques described herein relate to a system, wherein the housing having an audio indicator, the audio indicator is configured to generate a sound when the threshold logic detects a presence of the underground non-metallic pipe.

In some aspects, the techniques described herein relate to a system, wherein the detection logic having a pattern identifier, the pattern identifier configured to be executed on the at least a portion of the electrostatic flux pattern signature to identify a parameter of the underground non-metallic pipe, the parameter of the electrostatic flux pattern signature is configured to be matched, using the threshold logic, with at least one predetermined parameter from a database, the at least one predetermined parameter corresponding to a characteristic of the underground non-metallic pipe, the characteristic of the underground non-metallic pipe is configured to be displayed to a user in real-time.

In some aspects, the techniques described herein relate to a method including: receiving a first RF signal at a first antenna during at least one ambient sample, the first RF signal being at least one stray RF in an environment; receiving a second RF signal at a second antenna during at least one ground sample, the second antenna is directed toward a ground surface, the second RF signal being at least one RF generated from an electrostatic charge emitted from a underground non-metallic pipe, the underground non-metallic pipe is located under the ground surface; and detecting a presence of the underground non-metallic pipe based, at least in part, on a difference between a measurement of a strength of the first RF signal and a measurement of a strength of the second RF signal.

In some aspects, the techniques described herein relate to a method, further including: varying a flux of a fluid in the underground non-metallic pipe; and responsive to the varied flux of the fluid, detecting the presence of the underground non-metallic pipe.

In some aspects, the techniques described herein relate to a method, wherein: the measurement of the strength of the first RF signal received at the first antenna is obtained from one or more frequency bands; the measurement of the strength of the second RF signal received at the second antenna is obtained from at least one of the one or more frequency bands; and the difference between the measurement of the strength of the first RF signal and the measurement of the strength of the second RF signal includes the difference in measurements obtained at a same frequency band.

In some aspects, the techniques described herein relate to a method, wherein the measurement of the strength of the first RF signal received at the first antenna is obtained from a strongest detected AM signal.

In some aspects, the techniques described herein relate to a method, further including identifying at least one parameter of the underground non-metallic pipe, the at least one parameter being at least one of a diameter, a length, an elevation, and a depth, based, at least in part, on the difference between the measurement of the strength of the first RF signal and the measurement of the strength of the second RF signal.

In some aspects, the techniques described herein relate to an apparatus including: a RF receiver; and a processor, the processor configured to obtain a measurement of a strength of an ambient RF signal received at a first antenna and processed at the RF receiver, the processor configured to obtain a measurement of a strength of an RF signal emitted from ground received at a second antenna and processed at the RF receiver, the processor configured to detect a presence of an underground non-metallic pipe based, at least in part, on a difference between the measurement of the strength of the ambient RF signal and the measurement of the strength of the RF signal emitted from the ground.

In some aspects, the techniques described herein relate to an apparatus, and further including a visual alarm configured to alert an operator of a detected presence of the underground non-metallic pipe.

In some aspects, the techniques described herein relate to an apparatus, and further including an audio alarm configured to alert an operator of a detected presence of the underground non-metallic pipe.

In some aspects, the techniques described herein relate to an electrostatic detection system configured for detecting an effect of static charge on a RF signal signature of an underground non-metallic pipe, including: a housing, the housing including: circuitry, the circuitry including a central processing unit, the central processing unit having a memory, a detection logic, and a threshold logic; a RF receiver, the RF receiver is electrically connected to the circuitry; a first antenna, the first antenna is in electrical communication with the circuitry, the first antenna is configured to receive a first RF signal of at least one ambient sample, the first RF signal being at least one stray RF in an environment; a second antenna, the second antenna is in electrical communication with the circuitry, the second antenna is oriented in a direction towards a surface of ground, the second antenna is configured to receive a second RF signal from at least one ground sample, the second RF signal being at least one RF generated from an electrostatic charge emitted from at least one of a flow of a fluid, a flow disruptor, or particulate matter within a chamber of the underground non-metallic pipe; and the central processing unit is configured to execute steps to direct the first antenna to the RF receiver, the RF receiver is configured to measure a value of the at least one ambient sample and send the value to the memory, in response to storing the value of the at least one ambient sample using the first antenna, the central processing unit directs the second antenna to the RF receiver, the RF receiver is configured to measure a value of the at least one ground sample and send the value to the memory, the detection logic is configured to compare the value of the at least one ambient sample to the value of the at least one ground sample and calculate a difference, the difference forming at least a portion of an electrostatic flux pattern signature.

In some aspects, the techniques described herein relate to a system, wherein the housing having a display, the display is electrically connected to the circuitry, the display is configured to display the at least a portion of the electrostatic flux pattern signature to a user.

In some aspects, the techniques described herein relate to a system, wherein the housing having a visual indicator, the visual indicator is configured to illuminate when the threshold logic detects a presence of the underground non-metallic pipe.

In some aspects, the techniques described herein relate to a system, wherein the housing having an audio indicator, the audio indicator is configured to generate a sound when the threshold logic detects a presence of the underground non-metallic pipe.

In some aspects, the techniques described herein relate to a system, wherein the detection logic having a pattern identifier, the pattern identifier configured to be executed on the at least a portion of the electrostatic flux pattern signature to identify a parameter of the underground non-metallic pipe, the parameter of the electrostatic flux pattern signature is configured to be matched, using the threshold logic, with at least one predetermined parameter from a database, the at least one predetermined parameter corresponding to a characteristic of the underground non-metallic pipe, the characteristic of the underground non-metallic pipe is configured to be displayed to a user in real-time.

It is within the scope of this embodiment for a method and/or apparatus configured to detect, locate, trace plastic pipes and conduits that are buried in the earth by way of identifying changes in the ambient RF signal strength caused by electrostatic and/or triboelectric charges inside of the plastic pipe and/or conduit. The triboelectric effect is a type of contact electrification on which certain materials become electrically charged after they are separated from a different material with which they were in contact. This charge can be influenced by RF transmissions which can result in the charge alternating at frequency(s) the same as those transmitted. When using an RF meter to survey the earth, areas can be identified where an increase in the measured RF signal strength is recognized indicating the presence of buried plastic pipe. Metallic objects can also be detected with this method and/or apparatus. The RF transmissions are typically those already present in the surveyed environment.

It is within the scope of this embodiment for flux to be the rate of flow of a fluid through the chamber of an underground pipe. The apparatus is configured to detect RF signal strength changes during movement of the fluid within the underground non-metallic pipe noise. The second antennae is configured to detect RF signal strength changes during horizontal movement of the housing in relation to the surface of the ground when the housing is oriented from a first location to a second location over the surface of the ground.

Certain methods according to the various aspects of the embodiment may be performed by instructions that are stored upon a non-transitory computer readable medium. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code comprising instructions according to various example.

In the context of the present patent application, the term "connection," the term "component" and/or similar terms are intended to be physical but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described Certain examples have been described herein and it will be noted that different combinations of different components from different examples may be possible. Salient features are presented to better explain examples; however, it is clear that certain features may be added, modified, and/or omitted without modifying the functional aspects of these examples as described.

Practitioners skilled in the art will recognize many modifications and variations. The modifications and variations include any relevant combination of the disclosed features. Descriptions herein reciting principles, aspects, and embodiments encompass both structural and functional equivalents thereof. Embodiments described herein as "in electrical communication" or "electrically connected to" another device, module, or elements include any form of communication or link and include an effectual relationship. For example, a communication link may be established using a wired connection and/or a wireless protocol.

To the extent that the terms "including", "includes", "having", "has", "with", or variants thereof are used in either the detailed description and the claims, such terms are intended to be inclusive in a similar manner to the term "comprising."

The scope of the embodiment, therefore, is not intended to be limited to the exemplary embodiments and aspects that are shown and described herein. Rather, the scope and spirit of the embodiment is embodied by the appended claims.

What is claimed is:

1. An apparatus, comprising:
    one or more radio frequency receivers, at least one of the one or more radio frequency receivers being tunable to selected frequencies; and
    one or more processors to:
    tune at least one of the one or more radio frequency receivers to receive, via one or more antennas, at a radio frequency of a first radio frequency signal, the first radio frequency signal comprising an ambient radio frequency signal;
    obtain a measurement of a strength of an ambient signal energy, sampled over a first sample duration, of the first radio frequency signal received at the one or more antennas and processed at the at least one of the one or more radio frequency receivers while the at least one of the one or more radio frequency receivers is tuned to receive signal energy at the radio frequency of the first radio frequency signal;
    obtain a measurement of a strength of signal energy, sampled over a second sample duration, of a second radio frequency signal, the second radio frequency signal to be emitted from at least a portion of ground, received at the one or more antennas and processed at the at least one of the one or more radio frequency receivers while the at least one of the one or more radio frequency receivers is tuned to receive signal energy at the radio frequency of the first radio frequency signal; and
    determine that a difference between the measurement of the strength of the signal energy of the first radio frequency signal and the measurement of the strength of the signal energy of the second radio frequency signal meets a threshold condition to detect a presence of one or more underground non-electrically conductive pipes; and
    a visual and/or audio alarm to alert an operator of the detected presence of the one or more underground non-electrically conductive pipes.

2. The apparatus of claim 1, wherein the presence of the one or more underground non-electrically conductive pipes is detected based, at least in part, on a gain in the measurement of the strength of the signal energy of the second radio frequency signal with respect to the measurement of the strength of the signal energy of the first radio frequency signal.

3. The apparatus of claim 1, the at least one of the one or more radio frequency receivers is tuned so that the measurement of the strength of the signal energy of the ambient radio frequency signal received at the one or more antennas is obtained from a strongest detected AM signal.

4. The apparatus of claim 1, wherein the difference between the measurement of the strength of the signal energy of the first radio frequency signal and the measurement of the strength of the signal energy of the second radio frequency signal is computed as a gain in the measurement of the strength of the signal energy of the second radio frequency signal with respect to the measurement of the strength of the signal energy of the first radio frequency signal.

5. A method comprising:
    tuning at least one radio frequency receiver to receive, via one or more antennas, at a radio frequency of a first radio frequency signal, the first radio frequency signal comprising an ambient radio frequency signal;
    obtaining a measurement of a strength of an ambient signal energy, sampled over a first sample duration, of the first radio frequency signal received at the one or more antennas and processed at the at least one radio frequency receiver while the at least one radio frequency receiver is tuned to receive signal energy at the radio frequency of the first radio frequency signal;
    obtaining a measurement of a strength of signal energy, sampled over a second sample duration, of a second radio frequency signal emitted from the at least a portion of ground, received at the one or more antennas and processed at the at least one radio frequency receiver while the at least one radio frequency receiver is tuned to receive signal energy at the radio frequency of the first radio frequency signal; and
    determining that a difference between the measurement of the strength of the signal energy of the first radio frequency signal and the measurement of the strength of the signal energy of the second radio frequency signal meets a threshold condition to detect a presence of one or more underground non-electrically conductive pipes; and
    generating a visual and/or audio alarm to alert an operator of the detected presence of the one or more underground non-electrically conductive pipes.

6. The method of claim 5, wherein the presence of the one or more underground non-electrically conductive pipes is detected based, at least in part, on a difference between the measurement of the strength of the signal energy of the first radio frequency signal and the measurement of the strength of the signal energy of the second radio frequency signal emitted from the ground.

7. The method of claim 5, wherein the presence of the one or more underground non-electrically conductive pipes is detected based, at least in part, on a gain in the measurement of the strength of the signal energy of the second radio frequency signal with respect to the measurement of the strength of the signal energy of the first radio frequency signal.

8. The method of claim 5, further comprising:
varying a flux of fluid in at least one of the one or more underground non-electrically conductive pipes, and wherein detecting the presence of the one or more underground non-electrically conductive pipes further comprises detecting a change in a difference between the measurement of the strength of the signal energy of the first radio frequency signal and the measurement of the strength of the signal energy of the second radio frequency signal and/or a change a gain in the measurement of the strength of the signal energy of the second radio frequency signal with respect to the measurement of the strength of the signal energy of the first radio frequency signal responsive to the varied flux of the fluid.

9. The method of claim 5, wherein:
the measurement of the strength of the signal energy of the first radio frequency signal received at the one or more antennas is obtained from one or more frequency bands; and
the measurement of the strength of the signal energy of the second radio frequency signal received at the one or more antennas is obtained from at least one of the one or more frequency bands.

10. The method of claim 9, wherein the at least one radio frequency receiver is tuned so that the measurement of the strength of the signal energy of the first radio frequency signal received at the one or more antennas is obtained from a strongest detected AM signal.

11. The method of claim 5, further comprising measuring a diameter, length or depth of at least one of the one or more underground non-electrically conductive pipes, or a combination thereof, based, at least in part, on the measurement of the strength of the signal energy of the first radio frequency signal and the measurement of the strength of the signal energy of the second radio frequency signal.

12. The method of claim 11, wherein the diameter of the at least one of the one or more underground non-electrically conductive pipes is a measurement of a distance over which a peak in a measured strength of received signal energy of a radio frequency signal strength is sustained over a duration.

13. The method of claim 11, wherein the length of the at least one of the one or more underground non-electrically conductive pipes is determined by detecting a first sustained peak in a measured strength of received signal energy of a radio frequency signal and orienting the one or more antennas at least a portion of 180 degrees until a second sustained peak in the measured strength of received signal energy of radio frequency signal strength is detected.

14. The method of claim 11, wherein the depth of the at least one of the one or more underground non-electrically conductive pipes is determined by measuring a distance from a leading peak in a measured strength of received signal energy of the second radio frequency signal to a sustained peak in the measured strength of received signal energy of the second radio frequency signal.

15. The method of claim 5, wherein the difference between the measurement of the strength of the signal energy of the first radio frequency signal and the measurement of the strength of the signal energy of the second radio frequency signal is computed as a gain in the measurement of the strength of the signal energy of the second radio frequency signal with respect to the measurement of the strength of the signal energy of the first radio frequency signal.

* * * * *